United States Patent [19]
Berger

[11] 3,911,977
[45] Oct. 14, 1975

[54] FILLER PIPE END STRUCTURE, IN PARTICULAR FOR VEHICLE TANK

[75] Inventor: Jean-Marie Berger, Denney, France

[73] Assignees: Automobiles Peugeot; Regie Nationale des Usines Renault, both of Paris, France

[22] Filed: Sept. 12, 1974

[21] Appl. No.: 505,459

[30] Foreign Application Priority Data
Sept. 14, 1973 France .............................. 73.33037

[52] U.S. Cl. ............ 141/348; 220/86 R; 251/149.2; 141/326
[51] Int. Cl.² ........................................ B65D 29/02
[58] Field of Search ......... 251/149.2, 339; 137/351, 137/592, 588; 220/35, 36, 86 R, 86 AT; 141/348, 349, 350, 331, 335, 344, 325, 326

[56] References Cited
UNITED STATES PATENTS
3,730,216  5/1973  Arnett et al. ..................... 251/149.2
3,835,900  9/1974  Godbier ........................... 251/149.2
3,850,414  5/1971  Ginsburgh et al. ............... 251/149.2

Primary Examiner—Houston S. Bell, Jr.
Attorney, Agent, or Firm—Burns, Doane, Swecker & Mathis

[57] ABSTRACT

The end structure comprises, in a tubular member, in addition to an end wall defining a constricted passage a second wall adjacent the entrance of the tubular member defining a larger opening. The two walls define in the tubular member a relatively small chamber. The larger opening allows the passage therethrough of a "regulation" liquid distributor nozzle and a "non-regulation" liquid distributor nozzle. The constricted passage only allows the passage therethrough of a "regulation" liquid distributor nozzle which is of smaller diameter than the "non-regulation" liquid distributor nozzle. A valve member is yieldingly biased against the first wall to normally close the constricted passage unless a "regulation" liquid distributor nozzle is urged there against whereupon it opens the constricted passage to allow through the "regulation" liquid distributor nozzle.

5 Claims, 2 Drawing Figures

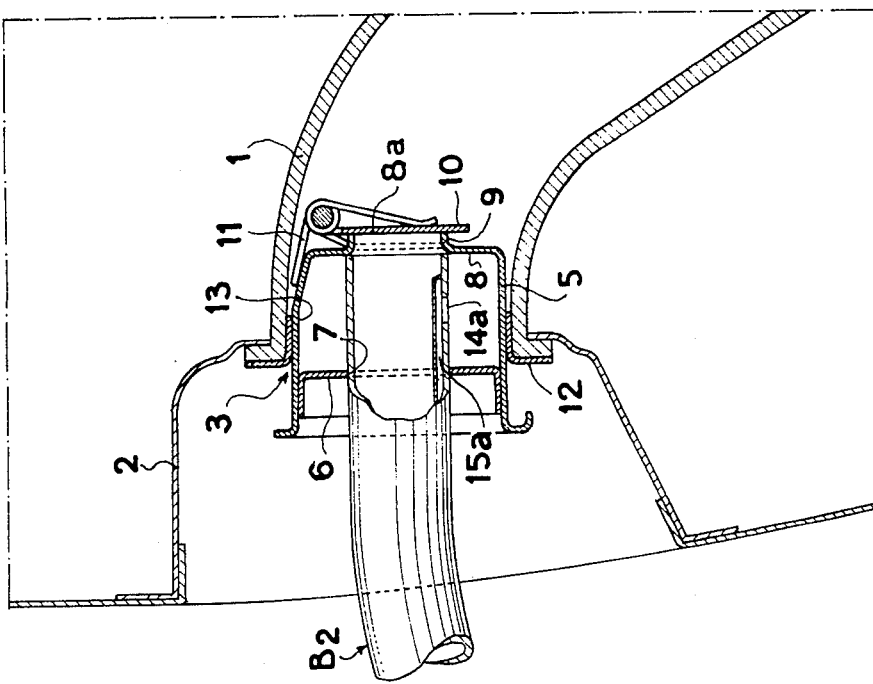
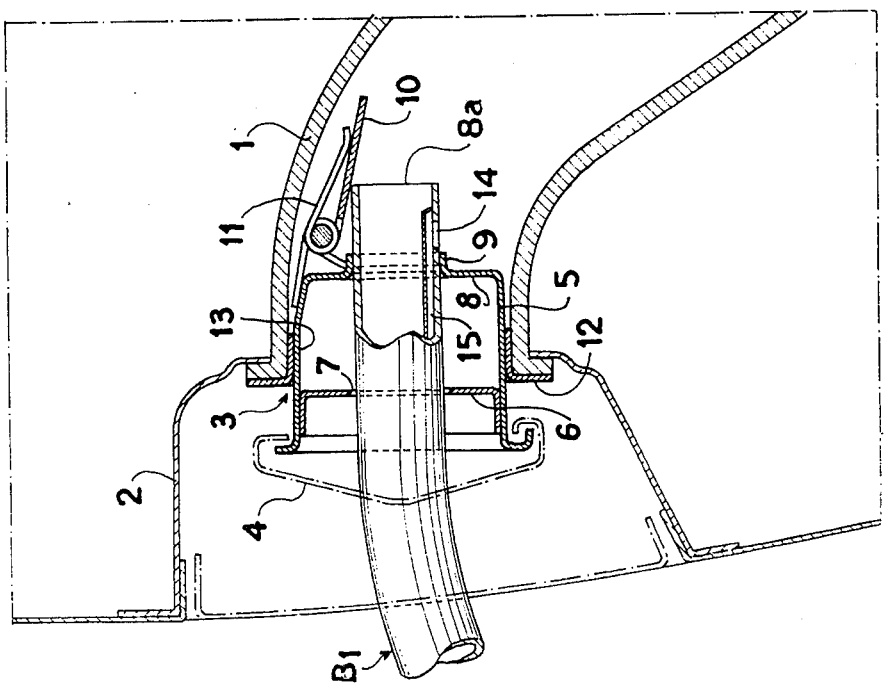

FILLER PIPE END STRUCTURE, IN PARTICULAR FOR VEHICLE TANK

The present invention relates to a filler pipe end structure for a liquid tank and in particular for a fuel tank of a vehicle, for example an automobile vehicle.

It is applicable to pipes adapted to receive a distributor nozzle provided with means adapted to automatically stop the flow of the liquid, said means comprising in the known manner a venting aperture located at a short distance from the end of the outlet nozzle and connected by a tube disposed along and inside the filler pipe to a device which automatically stops the flow of liquid when the latter reaches the level of the venting aperture.

It is known that in certain countries regulations forbid the use of conventional fuel for vehicles whose engines are, or will be, arranged to operate with improved fuels devoid of certain polluting bodies and in particular lead. At the same time however, the present fuels will still have to be sold for use by vehicles having engines of conventional type.

It is therefore necessary to preclude the introduction of conventional or ordinary fuels in tanks of vehicles equipped with engines which are non-polluting, bearing in mind that it is intended to employ for lead-free fuels distributor nozzles whose diameter is smaller than that of distributor nozzles for fuel with lead.

An object of the present invention is to provide a structure which is placed on the end of the filler pipe of the tank and automatically stops operation of the distributor when it is attempted to introduce fuel with lead in a tank which is designed to receive lead-free fuel. A further object of the invention is to obtain this result in a particularly effective manner with no introduction of non-regulation fuel in the tank and with negligible loss of fuel. In the contemplated application, "regulation fuel" will designate lead-free fuel.

An end structure according to the invention is of the type comprising a transverse wall defining a constricted passage having an inside diameter which is intermediate the outside diameter of the regulation distributor nozzle and the outside diameter of the non-regulation distributor nozzle and comprises a valve member associated with said passage and a second transverse wall which is disposed near to the filling end and defines a passage whose diameter is slightly greater than the outside diameter of the non-regulation fuel distributor nozzle, the two transverse walls defining therebetween a chamber of relatively small volume.

Further features and advantages of the invention and its operation will be described hereinafter with reference to the accompanying drawing given by way of example and in which:

FIG. 1 is a sectional view of a filler end structure according to the invention in which a regulation distributor nozzle has been introduced, and FIG. 2 is a sectional view of the same end structure in which a non-regulation distributor nozzle has been introduced.

In the illustrated embodiment, a filler pipe 1 fixed to the body 2 of a vehicle is connected to a fuel tank (not shown).

Adapted in the upper end portion of the pipe 1 is an end structure 3 to which a cap or plug 4 may be fixed. This end structure comprises a cylindrical sleeve 5 and two transverse walls, namely a front wall 6 in which is formed a passage 7 and a rear wall 8 defining a constricted passage 9.

The latter is closed by a valve member 10 which is biased by a spring 11 against a seat 8a defined by the wall 8. The sleeve 5 carries a flange 12 for securing it to the pipe 1.

The diameter of the passage 7 is slightly greater than the outside diameter of a non-regulation fuel distributor nozzle $B_2$ whereas the constricted passage 9 has a diameter between the respective outside diameters of a regulation fuel distributor nozzle $B_1$ and a non-regulation fuel distributor nozzle $B_2$.

The sleeve 5 and the two walls 6 and 8 define a chamber 13 of small volume, for example a few cubic centimetres.

FIG. 1 shows the introduction into the end structure according to the invention of a regulation fuel distributor nozzle $B_1$ provided with a venting aperture 14 connected by a tube 15 to an automatic fluid-flow stopping device of known type (not shown). This nozzle $B_2$, in passing through the constricted passage 9, urges back the valve member 10 so that the venting aperture 14 is located directly in the pipe 2. The filling is carried out normally and is stopped when the fuel reaches the level of the venting aperture 14 in the pipe.

FIG. 2 shows the introduction in the same filler end structure of a non-regulation fuel distributor nozzle $B_2$ which is also provided with a venting aperture 14a connected by a tube 16a to an automatic fluid-flow stopping device. This nozzle $B_2$ passes through the passage 7 with a small clearance and abuts against the periphery of the constricted passage 9 without bearing on the valve member 10 which remains closed. The venting aperture 14a opens into the interior of the sleeve 5 in the chamber 13.

If the distributor pump is started up, the rating of the spring 11 being sufficient to resist the dynamic pressure of the fuel, the valve member 10 remains closed and the fuel cannot enter the tank, not even in a small amount. On the other hand, the chamber 13, in performing the function of a micro-tank, almost immediately fills and thus closes the venting aperture 14a and consequently stops operation of the distributor pump.

Thus it can be seen that the device attains the desired result since no amount of fuel of non-regulation type can enter the tank and the loss of fuel is negligible owing to the very small volume of the chamber 13.

It must be understood that the end structure according to the invention may be constructed in a different manner and the valve member employed may be of a different type without departing from the scope of the invention.

Having now described my invention, what I claim as new and desire to secure by Letters Patent is:

1. An end structure for fixing to an end portion of a filler pipe of a tank for receiving a liquid distributor nozzle and precluding supply of "non-regulation" liquid to the tank, said end structure comprising in combination:

a tubular member having a flanged entrance end adapted to receive a filler cap, an imperforate wall, and a first transverse wall defining a constricted passage in the tubular member remote from said entrance end, a valve member operative to close and open said constricted passage, yieldable means for yieldably biasing said valve member to a passage-closing position of the valve member, and a second transverse wall disposed in said tubular member adjacent said entrance end and defining a second passage, the two transverse walls and said tubular member defining a chamber of relatively small volume and said constricted passage having a first predetermined size slightly larger than the exterior of a "regulation" liquid distributor nozzle and capable of allowing the passage through the first wall of a "regulation" liquid distributor nozzle with a small clearance between the nozzle and the constricted passage while precluding the passage therethrough of a "non-regulation" liquid distributor nozzle and said second passage having a second predetermined size, larger than the first predetermined size, slightly larger than the exterior of a "non-regulation" liquid distributor nozzle, and capable of allowing the passage through the second wall of a "non-regulation" liquid distributor nozzle with a small clearance between the nozzle and the second passage, said valve member biasing means being capable of holding the valve member in its constricted passage closing position against the pressure of said liquid and allowing the valve member to move to its constricted passage opening position upon exertion of a thrust on the valve member by the "regulation" liquid distributor nozzle.

2. An end structure as claimed in claim 1, wherein a valve seat is integral with the first wall and is cooperative with the valve member.

3. An end structure as claimed in claim 1, wherein said constricted and second apertures are circular.

4. An end structure as claimed in claim 1 employed with distributor nozzles provided with automatic means for automatically stopping the flow of liquid when the liquid reaches the close vicinity of the outlet of the distributor nozzle.

5. An end structure as claimed in claim 4, wherein said automatic means comprise a venting orifice in the distributor nozzles, said second wall being located in such position relative to said first wall that when a "non-regulation" liquid distributor nozzle abuts said first wall the venting orifice is disposed within said chamber.

* * * * *